(12) United States Patent
Ettelt et al.

(10) Patent No.: US 10,953,607 B2
(45) Date of Patent: Mar. 23, 2021

(54) ARRANGEMENT HAVING A SCALE ATTACHED TO A CARRIER

(71) Applicant: DR. JOHANNES HEIDENHAIN GmbH, Traunreut (DE)

(72) Inventors: Dirk Ettelt, Palling (DE); Reiner Lang, Garching (DE); Wolfgang Pucher, Traunstein/Rettenbach (DE); Thomas Sigl, Stephanskirchen (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 234 days.

(21) Appl. No.: 16/168,842

(22) Filed: Oct. 24, 2018

(65) Prior Publication Data

US 2019/0126564 A1 May 2, 2019

(30) Foreign Application Priority Data

Oct. 26, 2017 (EP) ..................... 17198463

(51) Int. Cl.
*B29C 65/48* (2006.01)
*G01D 5/347* (2006.01)
*B29C 65/00* (2006.01)

(52) U.S. Cl.
CPC .... *B29C 65/4845* (2013.01); *B29C 66/72325* (2013.01); *G01D 5/34707* (2013.01); *B29C 66/8322* (2013.01)

(58) Field of Classification Search
CPC .......... B29C 65/4845; B29C 66/72325; B29C 66/8322; G01D 5/34707; G01D 5/24442; G01D 5/34753; G01D 11/245; G01D 5/34715; G01D 5/12; G01D 5/14; G01D 5/24423

USPC ........................................... 33/706
See application file for complete search history.

(56) References Cited

U.S. PATENT DOCUMENTS

| | | | | |
|---|---|---|---|---|
| 6,349,481 B1* | 2/2002 | Nelle | ................. | G01D 5/34707 33/701 |
| 7,188,433 B2* | 3/2007 | Boge | .................. | G01D 5/34707 33/613 |
| 7,347,001 B2* | 3/2008 | Boge | ..................... | F16B 5/0225 33/568 |
| 2002/0063321 A1* | 5/2002 | Sauter | .................... | H05K 3/305 257/678 |
| 2006/0021242 A1* | 2/2006 | Boge | .................. | G01D 5/34707 33/706 |
| 2007/0137059 A1* | 6/2007 | Holzapfel | .......... | G01D 5/34707 33/706 |
| 2007/0194438 A1* | 8/2007 | Takasaki | ............... | H01L 21/681 257/704 |

(Continued)

FOREIGN PATENT DOCUMENTS

| EP | 1621847 A1 | 2/2006 |
|---|---|---|
| EP | 3023742 A1 | 5/2016 |

*Primary Examiner* — Yaritza Guadalupe-McCall

(74) *Attorney, Agent, or Firm* — Leydig, Voit & Mayer Ltd.

(57) ABSTRACT

An arrangement includes a carrier and a scale disposed on the carrier in a spaced-apart relation therewith. The scale has a measuring graduation and is attached to the carrier via areally distributed and spaced-apart adhesive dots. The adhesive dots, which can be circular in shape, each include at least three spacers, which can be spheres, enclosed within an adhesive.

15 Claims, 2 Drawing Sheets

(56) References Cited

U.S. PATENT DOCUMENTS

2007/0281149 A1    12/2007  Martens et al.
2019/0126564 A1*    5/2019  Ettelt ................. G01D 5/34707

* cited by examiner

ARRANGEMENT HAVING A SCALE ATTACHED TO A CARRIER

CROSS-REFERENCE TO PRIOR APPLICATION

Priority is claimed to European Patent Application No. EP 17198463.6, filed on Oct. 26, 2017, the entire disclosure of which is hereby incorporated by reference herein.

FIELD

The present invention relates to an arrangement to measure the relative position of two machine parts, wherein a scale is attached to one of the machines parts, and a scanning unit is attached to the other of the relatively movable machine parts. During position measurement, a measuring graduation of the scale is scanned by the scanning unit, and position-dependent scanning signals are generated.

BACKGROUND

US 2007/0281149 A1 describes an arrangement having a scale disposed on a carrier in spaced-apart relation therewith. The scale is attached to the carrier by means of areally distributed and spaced-apart adhesive dots.

As stated in US 2007/0281149 A1 itself, this design has the disadvantage that shrinkage of the adhesive can lead to local bending of the scale, resulting in measurement errors during position measurement with this scale.

SUMMARY

In an embodiment, the present invention provides an arrangement which includes a carrier and a scale disposed on the carrier in a spaced-apart relation therewith. The scale has a measuring graduation and is attached to the carrier via areally distributed and spaced-apart adhesive dots. The adhesive dots, which can be circular in shape, each include at least three spacers, which can be spheres, enclosed within an adhesive.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention provides an arrangement having a scale attached to a carrier, the scale being held to the carrier with as little drift as possible, so that this scale enables high-accuracy position measurement.

During measurement operation, the scale is stably attached to the carrier, which means high stiffness in the measurement direction and perpendicular to the measuring graduation plane.

Figure 1:
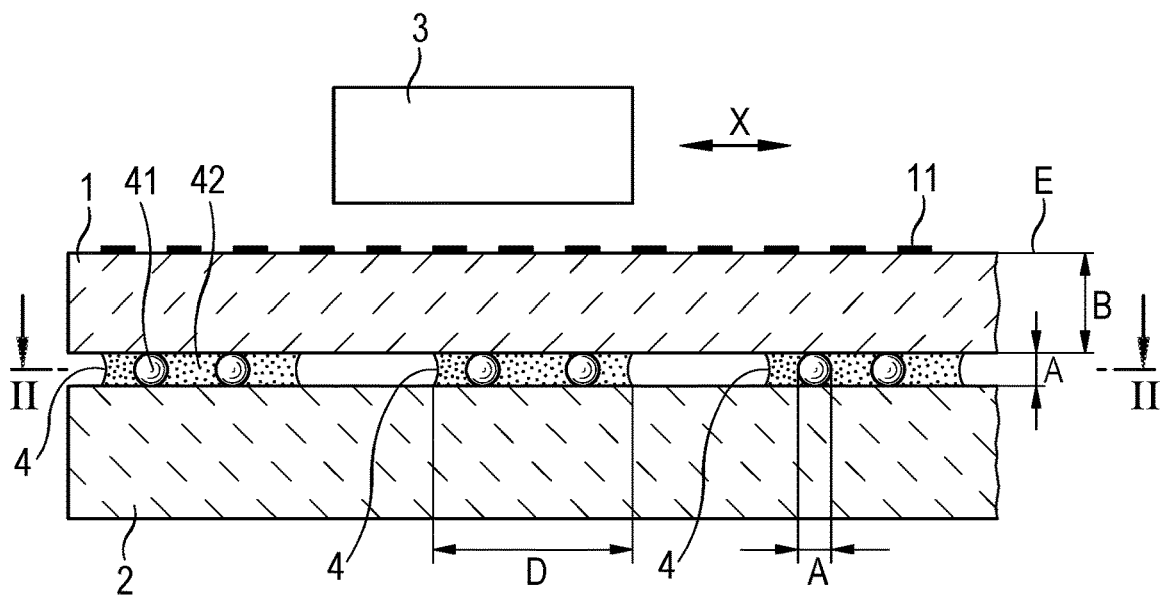
FIG. 1 is a sectional view showing a schematic configuration of a position-measuring device having a carrier and a scale attached thereto.
Figure 2:
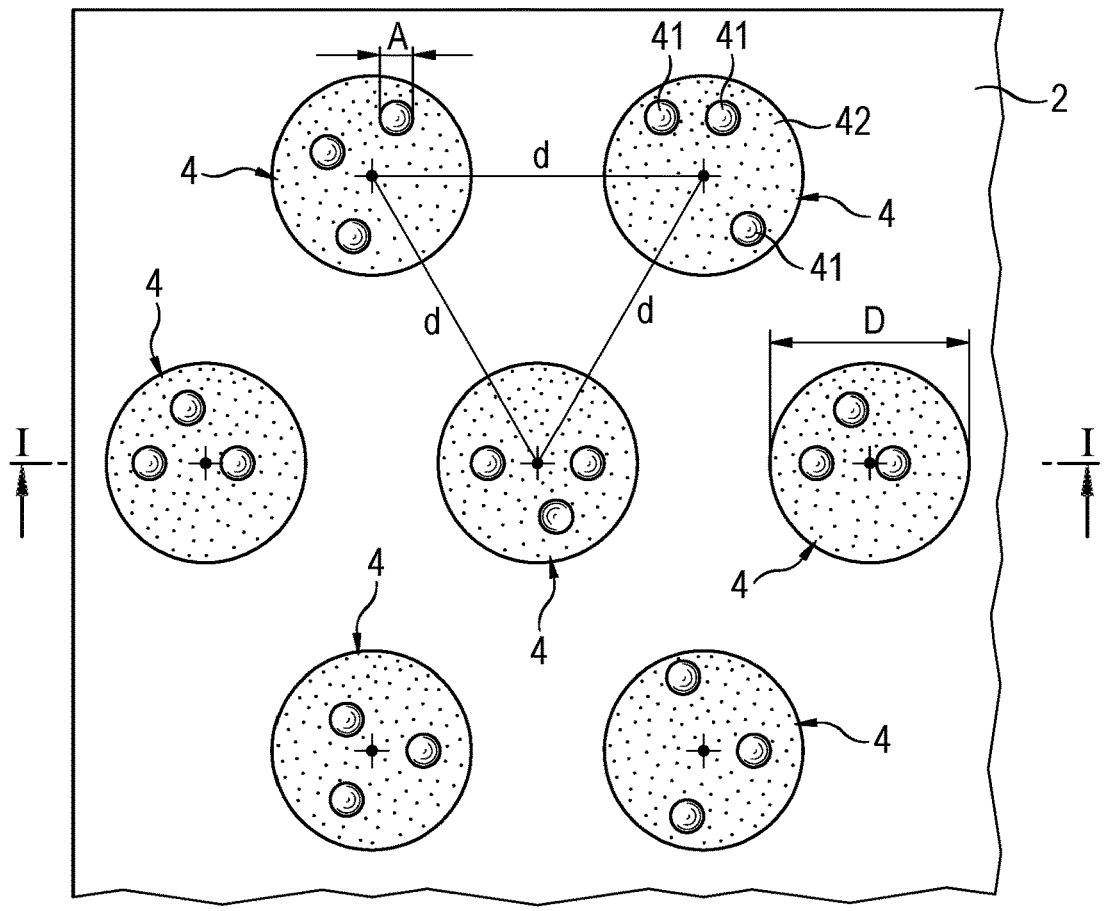
FIG. 2 is a view taken along line II-II in FIG. 1.
Figure 3:
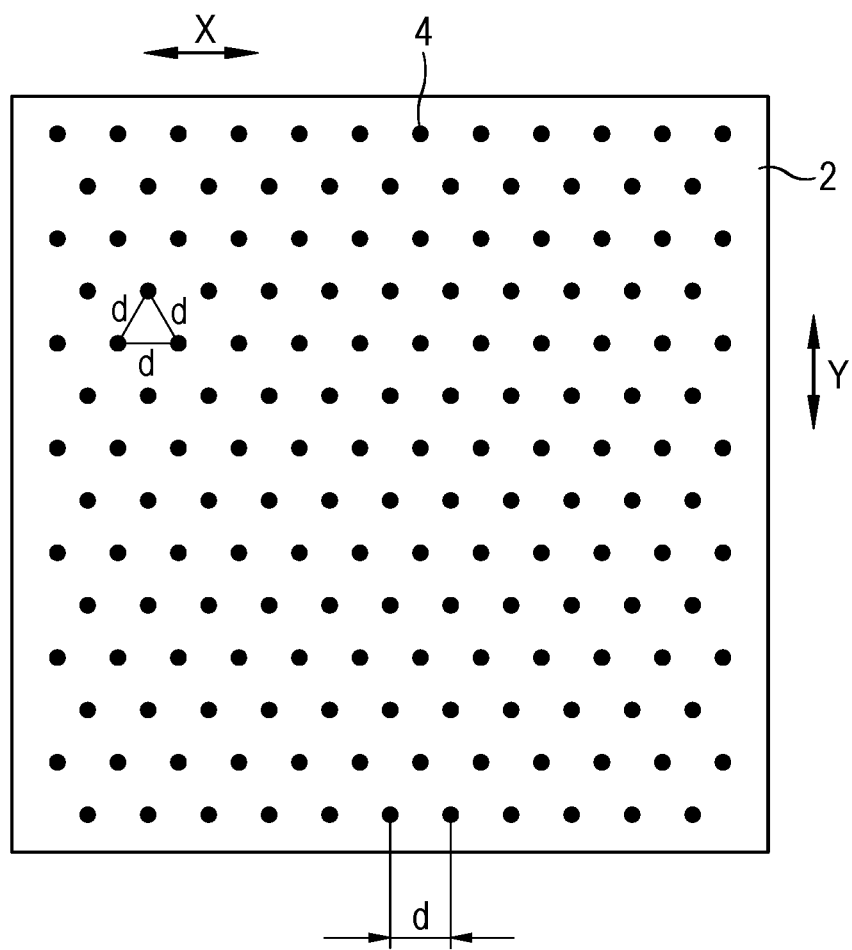
FIG. 3 is a view illustrating the two-dimensional arrangement of adhesive dots on the carrier.

Referring to FIGS. 1-3, in accordance with an embodiment of the present invention, a scale 1 is held to a carrier 2 via an arrangement of adhesive dots 4. Each of the adhesive dots 4 is composed of an adhesive 42 having spherical spacers 41 mixed therein. Because the spacers 41 rest directly on the carrier 2 on the one hand and, on the other hand, the scale 1 rests directly on the spacers 41, it is ensured that the scale 1 rests flat on the carrier 2. The adhesive 42 ensures that the scale 1 is stably held to the carrier.

An exemplary embodiment of the present invention will be described with reference to FIGS. 1 through 3. The illustrated position-measuring device is comprised of an arrangement having a scale 1 that is attached to a carrier 2 and carries a measuring graduation 11. In the example, measuring graduation 11 is an incremental graduation which, during position measurement, is photoelectrically scanned by a scanning unit 3 in at least one measurement direction X to generate position-dependent scanning signals. Measuring graduation 11 may be an amplitude grating or a phase grating that serves in a known manner for high-accuracy interferential position measurement. Measuring graduation 11 may also be configured for two-dimensional position measurement by having a graduation structure in the X-direction and in the Y-direction. For purposes of position measurement, scale 1 is held to carrier 2 at a distance A therefrom. Carrier 2 is preferably composed of a material that has the same thermal expansion coefficient as scale 1. The mean coefficient of thermal expansion a of scale 1 and carrier 2 in the temperature range of from 0° to 50° C. is preferably less than $0.1 \times 10^{-6} K^{-1}$ when using glasses, ceramics or glass ceramics having what is generally referred to as zero expansion, such as ZERODUR, SITAL and ULE, and less than $1.5 \times 10^{-6} K^{-1}$ when using metals such as, for example, INVAR.

Scale 1 is attached to carrier 2 via areally distributed and spaced-apart adhesive dots 4.

Adhesive dots 4 are each composed of an adhesive 42 in which at least three spacers 41 are enclosed and areally distributed. This means that the at least three spacers 41 of an adhesive dot 4 are entirely surrounded or enclosed within the volume of adhesive 42 of adhesive dot 4.

The mass fraction of the spacers 41 in an adhesive dot 4 is approximately from 1 to 10%. The mass fraction indicates the mass percentage of the spacers 41 in the total mass of the mixture constituting the adhesive dot 4, the total mass being the mass including all spacers 41 of adhesive dot 4 plus the adhesive 42 of the respective adhesive dot 4.

Ideally, spacers 41 have a height exactly equal to the required distance A. The dimensional tolerance of spacers 41 is less than 10% of the nominal dimension, the nominal dimension being the desired distance A.

Spacers 41 may be of different types. They may be raised structures formed in carrier 2 and/or in scale 1, or they may be structures or individual elements applied to carrier 2 or to scale 1.

If spacers 41 are individual elements, then it is advantageous for them to be bound within adhesive 42 already during application to carrier 2 or to scale 1. When joining carrier 2 and scale 1 together, the individual elements align themselves such that, in the assembled condition of carrier 2 and scale 1, the individual elements rest on carrier 2 on the one hand and, on the other hand, scale 1 rests on the individual elements.

The individual elements are preferably spheres or cylinders bound within adhesive 42, and the material of the individual elements is preferably glass, ceramic or glass-ceramic material.

In the embodiment described in detail below, spacers 41 are individual elements and are spheres.

Each of adhesive dots 4 includes at least three spacers 41 in the form of spheres which are embedded in adhesive 42 and areally distributed in adhesive dot 4. Ideally, each of adhesive dots 4 contains the same number of spacers 41. Scale 1 is supported by spherical spacers 41 on the one hand by the spacers resting on carrier 2 and, on the other hand, by scale 1 resting on spacers 41. Spherical spacers 41 are each in punctiform contact with scale 1 at its underside or bearing surface on the one hand and, on the other hand, are each in punctiform contact with carrier 2 at its top side opposite the scale 1. This ensures that the flatness of scale 1 is not negatively affected by other media. The purpose of adhesive 42 is to fix the plurality of spacers 41 in place within the volume of the respective adhesive dot 4 and to produce and maintain the holding force between carrier 2 and scale 1.

Spacers 41 are composed of a material that resists the occurring pressure forces to the extent possible without deformation. Suitable materials include, for example, glass, ceramic or glass-ceramic material. An example of a material that has proven suitable is borosilicate glass. Advantageously, spacers 41 are composed of a material that has the same or at least a similar coefficient of expansion as scale 1.

Adhesive dots 4 are spaced apart from one another by a center-to-center distance d less than five times the thickness B of scale 1. Furthermore, it is advantageous if the diameter D of each of adhesive dots 4 is less than the thickness B of scale 1. These conditions are met at all points of the two-dimensional distribution of adhesive dots 4, but at least within the measuring range. The measuring range is defined by the region of measuring graduation 11 that is used for high-accuracy position measurement. Thickness B of scale 1 is the distance between measuring graduation plane E, in which the measuring graduation 11 is located, and the bearing surface by which scale 1 rests on spacers 41.

As can be seen in the sectional view of FIG. 1, it is particularly advantageous if the two-dimensionally distributed adhesive dots 4 are arranged directly opposite the measuring graduation 11 of scale 1, which defines the measuring range.

The two-dimensional arrangement of adhesive dots 4 is advantageously produced in such a way that clearance spaces are formed therebetween which are in communication with each other and thus provide channels leading to the outside. To this end, adhesive dots 4 are spaced apart from one another by a center-to-center distance d greater than adhesive dot diameter D. This measure allows the air to be released outwardly through the channels into the environment homogeneously over the entire area of scale 1, which ensures good flatness of scale 1 during assembly as well as during measurement operation.

The spaced-apart arrangement of adhesive dots 4 further has the advantage that sufficient volume is available for the curing as well as for the subsequent aging of adhesive 42 without affecting distance A between carrier 2 and scale 1.

Typical values for thickness B of scale 1 range from 0.5 mm to 15 mm.

Spherical spacers 41, or else cylindrical spacers, have a diameter equal to distance A between carrier 2 and scale 1. Typical values for distance A and thus for the diameter of spacers 41 are between 5 μm and 250 μm.

It is particularly advantageous if adhesive dots 4 each have a circular outer contour and have the same diameter D. Diameter D of adhesive dots 4 is preferably less than thickness B of scale 1.

Typical values for diameter D of adhesive dots 4 are in the range from 1 mm to 3 mm.

A typical value for center-to-center distance d of adhesive dots 4 is about 8 mm.

FIGS. 2 and 3 show a particularly advantageous arrangement of adhesive dots 4. The adhesive dots are arranged in an evenly spaced grid in which the center-to-center distances d between all adjacent adhesive dots 4 are equal. This means that the center-to-center distances d between any three adhesive dots 4 arranged two-dimensionally adjacent to each other define an equilateral triangle, one such triangle being drawn in FIG. 2 and FIG. 3. This two-dimensional symmetrical distribution of adhesive dots 4 also results in a symmetrical and thus particularly advantageous distribution of the mechanical stresses. The outer contour of adhesive dots 4 is ideally a circular shape.

This evenly spaced grid or two-dimensional pattern is obtained by equidistantly arranging adhesive dots 4 side by side in a plurality of rows, the adhesive dots 4 of the second one of two successive rows being staggered from the adhesive dots 4 of the first row by half the center-to-center distance d in the row direction.

This measure results in a distribution of adhesive dots 4 in a plane parallel to plane E of measuring graduation 11 in such a way that the six adhesive dots 4 arranged around and most proximate to an adhesive dot 4 have equal center-to-center distances d from the central adhesive dot 4 on the one hand and, on the other hand, the connections between the centers of these six adhesive dots 4 form an equilateral hexagon in which all sides have the same length d.

The method for producing adhesive dots 4 includes the following steps:

1. Mixing spacers 41—in the example individual elements, in particular in the form of spheres—into adhesive 42, it being desired for the individual elements to be distributed as homogeneously as possible within the mixture.
2. Applying to carrier 2 or scale 1 an evenly spaced pattern of discrete adhesive drops containing adhesive 42 and the admixed individual elements. In order to achieve, to the extent possible, the same properties for all adhesive dots 4, care must be taken to ensure that the quantity of the mixture to be applied is as constant as possible for all adhesive drops.
3. Joining carrier 2 and scale 1 together until the individual elements assume the function of spacers 41 as a result of the surface pressure developing in the process. In this process, there is obtained the circular shape of adhesive dots 4 and, depending on the quantity of adhesive 42 and the diameter of spacers 41, also the desired diameter D of adhesive dots 4.
4. Curing adhesive 42 by light (UV light) and/or heat.

FIG. 3 shows, by way of example, the evenly spaced, areal distribution of adhesive dots 4 on the entire carrier 2 under the assumption that d=8 mm and that carrier 2 is dimensioned about 10 cm×10 cm.

In place of or in addition to incremental measuring graduation 11, an absolute code may also be provided on scale 1.

The inventive measure ensures that none of the tensile and compressive stresses introduced as a result of the attachment of scale 1 will manifest itself as a length error in measuring graduation plane E. The arrangement configured according to the present invention makes it possible to achieve a deformation-free measuring graduation plane E that permits accurate position measurement. Because scale 1 is supported directly opposite the measuring graduation 11, it is stably attached to carrier 2 during measurement operation, which means high stiffness in measurement direction X and perpendicular to measuring graduation plane E.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An arrangement comprising:
   a carrier; and
   a scale disposed on the carrier in a spaced-apart relation therewith, the scale having a measuring graduation and being attached to the carrier via areally distributed and spaced-apart adhesive dots,
   wherein the adhesive dots each include at least three spacers enclosed within an adhesive.

2. The arrangement as recited in claim 1, wherein the adhesive dots are spaced apart from one another by equal center-to-center distances such that the center-to-center distances between any three adjacent ones of the adhesive dots define an equilateral triangle.

3. The arrangement as recited in claim 1, wherein the mass fraction of the spacers in one of the adhesive dots is from 1 to 10%.

4. The arrangement as recited in claim 1, wherein the adhesive dots are each circular in shape.

5. The arrangement as recited in claim 4, wherein all of the adhesive dots have the same diameter which is less than a thickness of the scale.

6. The arrangement as recited in claim 4, wherein a diameter of the adhesive dots is from 1 mm to 3 mm.

7. The arrangement as recited in claim 1, wherein the adhesive dots are spaced apart from one another by a center-to-center distance less than five times the thickness of the scale.

8. The arrangement as recited in claim 1, wherein the adhesive dots are arranged opposite the measuring graduation of the scale, which defines a measuring range.

9. The arrangement as recited in claim 1, wherein the adhesive dots are spaced apart from one another in such a way that the adhesive dots create clearance spaces in between themselves which provide channels leading to an outside.

10. The arrangement as recited in claim 1, wherein materials of the carrier and of the scale have the same coefficient of thermal expansion.

11. The arrangement as recited in claim 10, wherein the coefficient of expansion of the carrier and of the scale is less than $1.5 \times 10^{-6} K^{-1}$.

12. The arrangement as recited in claim 11, wherein the coefficient of expansion of the carrier and of the scale is less than $0.1 \times 10^{-6} K^{-1}$.

13. The arrangement as recited in claim 1, wherein the spacers are individual elements bound within the adhesive, wherein the individual elements rest on the carrier, and wherein the scale rests on the individual elements.

14. The arrangement as recited in claim 13, wherein the individual elements are spheres.

15. The arrangement as recited in claim 13, wherein a material of the individual elements is glass, ceramic or glass-ceramic material.

* * * * *